(12) United States Patent
Chieu et al.

(10) Patent No.: US 10,896,247 B2
(45) Date of Patent: Jan. 19, 2021

(54) CONTROLLING ACCESS TO DOCUMENTS BY PARTIES

(71) Applicant: International Business Machines Corporation, Armonk, NY (US)

(72) Inventors: Trieu C. Chieu, Scarsdale, NY (US); Manikandan Dharamarajan, Norwalk, CT (US); Thomas Yu-Kiu Kwok, Township of Washington, NJ (US); Linh H. Lam, Yorktown Heights, NY (US); Thao N. Nguyen, Katonah, NY (US); Kakan Roy, Bangalore (IN); Amit J. Shah, Pune (IN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 15/878,439

(22) Filed: Jan. 24, 2018

(65) Prior Publication Data
US 2018/0150442 A1 May 31, 2018

Related U.S. Application Data

(62) Division of application No. 13/443,392, filed on Apr. 10, 2012, now Pat. No. 9,971,750, and a division of
(Continued)

(51) Int. Cl.
*G06F 21/31* (2013.01)
*G06F 16/93* (2019.01)
(Continued)

(52) U.S. Cl.
CPC ............. *G06F 21/31* (2013.01); *G06F 16/93* (2019.01); *G06Q 10/10* (2013.01); *G06Q 90/20* (2013.01)

(58) Field of Classification Search
CPC ...................................................... G06F 16/93
See application file for complete search history.

(56) References Cited

U.S. PATENT DOCUMENTS

| 5,530,752 A | 6/1996 | Rubin |
| 7,058,648 B1 * | 6/2006 | Lightfoot ............ G06F 21/6218 |

(Continued)

OTHER PUBLICATIONS

Office Action dated Apr. 29, 2011, regarding U.S. Appl. No. 12/042,424, 16 pages.
(Continued)

*Primary Examiner* — Jay Huang
(74) *Attorney, Agent, or Firm* — Yee & Associates, P.C.

(57) ABSTRACT

Access to documents by parties can be controlled as follows. First, access can be controlled in accordance with access counters associated with the parties, where the documents have one or more versions. Second, access can be controlled in accordance with access levels associated with the parties. The access level of each party is one of a first access level, a second access level, a third access level, or a fourth access level. The first, second, third, and fourth access levels are ordered from the first access level to the fourth access level such that the first access level provides a greatest degree of access to the documents and the fourth access level provides a least degree of access to the documents. Third, access can be controlled in accordance with placement of organizations within a hierarchy of organizations, where the parties are organized over the organizations.

5 Claims, 10 Drawing Sheets

Related U.S. Application Data application No. 12/042,424, filed on Mar. 5, 2008, now Pat. No. 9,323,751.

(51) Int. Cl.
*G06Q 10/10* (2012.01)
*G06Q 90/00* (2006.01)

(56) References Cited

U.S. PATENT DOCUMENTS

| | | | |
|---|---|---|---|
| 7,152,166 B2 | 12/2006 | Strom et al. | |
| 7,184,947 B2 | 2/2007 | Matsouka et al. | |
| 7,386,550 B2 | 6/2008 | Brun | |
| 7,669,051 B2 | 2/2010 | Redlich et al. | |
| 9,323,751 B2 | 4/2016 | Chieu et al. | |
| 2002/0095432 A1 | 7/2002 | Shimomura et al. | |
| 2002/0112171 A1* | 8/2002 | Ginter | G06Q 20/085 |
| | | | 713/185 |
| 2004/0003267 A1 | 1/2004 | Strom et al. | |
| 2004/0064710 A1* | 4/2004 | Vainstein | G06F 21/6209 |
| | | | 713/189 |
| 2005/0138110 A1 | 6/2005 | Redlich et al. | |
| 2006/0074806 A1* | 4/2006 | McKegney | G06Q 50/24 |
| | | | 705/51 |
| 2006/0136513 A1 | 6/2006 | Ngo et al. | |
| 2007/0038437 A1 | 2/2007 | Brun | |
| 2007/0094358 A1 | 4/2007 | Uchida et al. | |
| 2007/0143859 A1 | 6/2007 | Ogi et al. | |
| 2007/0198637 A1 | 8/2007 | Deboy et al. | |
| 2007/0245409 A1 | 10/2007 | Harris et al. | |
| 2007/0260648 A1 | 11/2007 | Friesenhahn et al. | |
| 2008/0059539 A1 | 3/2008 | Chin et al. | |
| 2008/0294478 A1 | 11/2008 | Joshi et al. | |
| 2009/0043774 A1 | 2/2009 | Sudhakar | |
| 2009/0157445 A1* | 6/2009 | Morinville | G06Q 10/0633 |
| | | | 705/7.27 |
| 2009/0228311 A1 | 9/2009 | Chieu et al. | |
| 2010/0004938 A1 | 1/2010 | Sundstrom et al. | |
| 2012/0197942 A1 | 8/2012 | Chieu et al. | |

OTHER PUBLICATIONS

Final Office Action dated Jan. 26, 2012, regarding U.S. Appl. No. 12/042,424, 18 pages.
Notice of Allowance dated Jan. 29, 2016, regarding U.S. Appl. No. 12/042,424, 14 pages.
Office Action dated Jun. 28, 2013, regarding U.S. Appl. No. 13/443,392, 20 pages.
Final Office Action dated Jan. 16, 2014, regarding U.S. Appl. No. 13/443,392, 17 pages.
Office Action, dated Apr. 21, 2016, regarding U.S. Appl. No. 13/443,392, 22 pages.
Final Office Action, dated Nov. 9, 2016, regarding U.S. Appl. No. 13/443,392, 15 pages.
Office Action, dated Aug. 7, 2017, regarding U.S. Appl. No. 13/443,392, 19 pages.
Final Office Action, dated Nov. 30, 2017, regarding U.S. Appl. No. 13/443,392, 17 pages.
Notice of Allowance, dated Jan. 10, 2018, regarding U.S. Appl. No. 13/443,392, 8 pages.

* cited by examiner

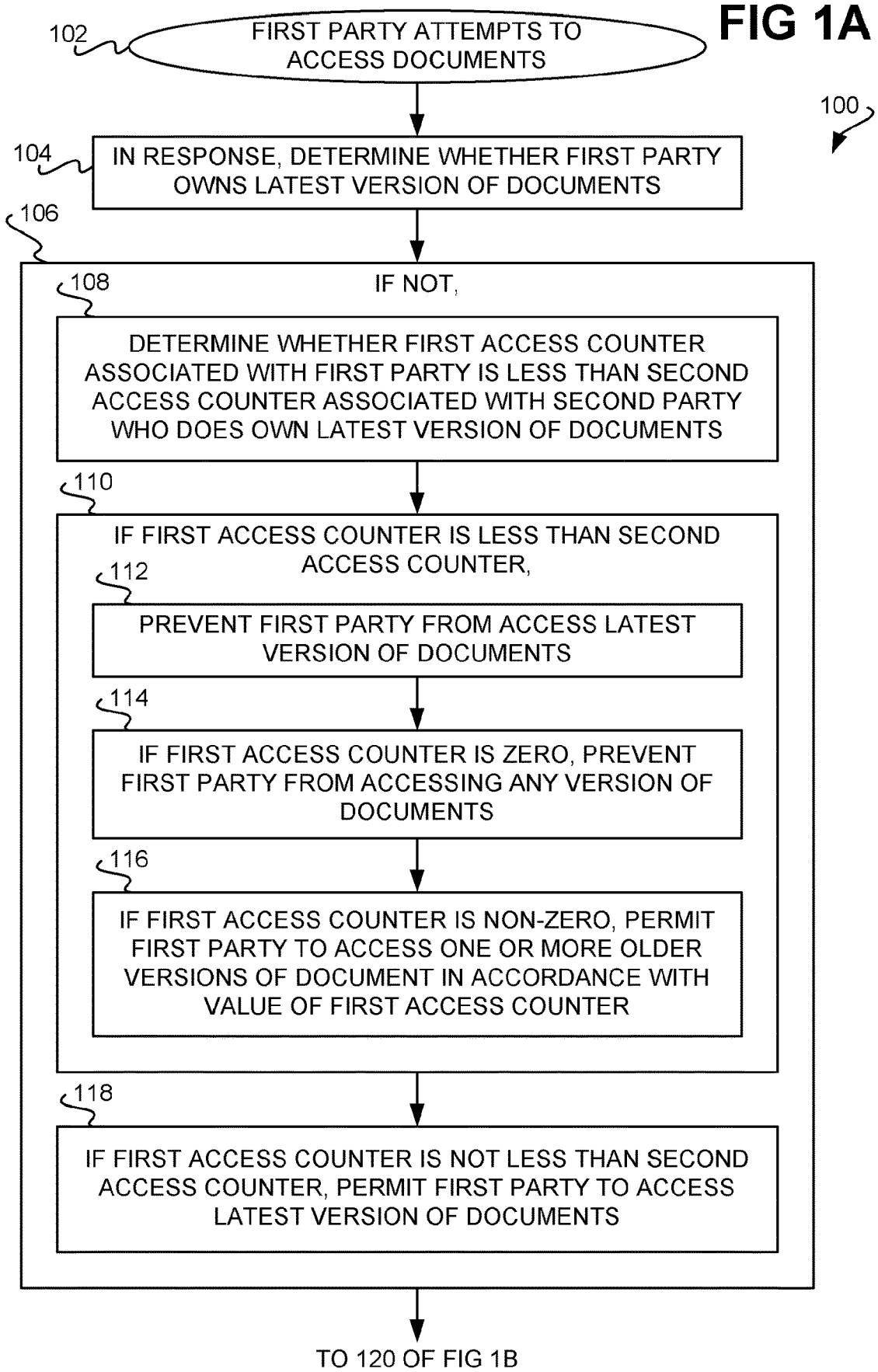

FIG 2B

| | PARTY | ACCESS COUNTER | DOCUMENT VERSION | (PERFORMER) STATE → ACTION |
|---|---|---|---|---|
| 252 | DISTRIBUTOR<br>RESELLER<br>CUSTOMER | 0<br>0<br>0 | -<br>-<br>- | (DISTRIBUTOR)<br>START<br>↓<br>SUBMIT<br>↓ |
| 254 | DISTRIBUTOR<br>RESELLER<br>CUSTOMER | 1<br>0<br>0 | 1<br>-<br>- | (DISTRIBUTOR)<br>SUBMITTED<br>↓<br>DENY<br>↓ |
| 256 | DISTRIBUTOR<br>RESELLER<br>CUSTOMER | 2<br>0<br>0 | 1<br>-<br>- | (DISTRIBUTOR)<br>DENIED<br>↓<br>UPDATE<br>↓ |
| 258 | DISTRIBUTOR<br>RESELLER<br>CUSTOMER | 3<br>0<br>0 | 2<br>-<br>- | (DISTRIBUTOR)<br>SUBMITTED<br>↓<br>APPROVE<br>↓ |
| 260 | DISTRIBUTOR<br>RESELLER<br>CUSTOMER | 4<br>1<br>0 | 2<br>2<br>- | (RESELLER)<br>REVIEWED<br>↓<br>PROCESS<br>↓ |
| 262 | DISTRIBUTOR<br>RESELLER<br>CUSTOMER | 5<br>2<br>1 | 2<br>2<br>2 | (CUSTOMER)<br>NEW<br>↓<br>REQUEST CHANGES<br>↓ |
| 264 | DISTRIBUTOR<br>RESELLER<br>CUSTOMER | 6<br>3<br>2 | 2<br>2<br>2 | (RESELLER)<br>CHANGE REQUESTED<br>↓<br>UPDATE<br>↓ |
| 266 | DISTRIBUTOR<br>RESELLER<br>CUSTOMER | 7<br>4<br>3 | 3<br>3<br>2 | (RESELLER)<br>UPDATED<br>↓<br>APPROVE<br>↓ |
| 268 | DISTRIBUTOR<br>RESELLER<br>CUSTOMER | 8<br>5<br>4 | 3<br>3<br>3 | (CUSTOMER)<br>NEW |

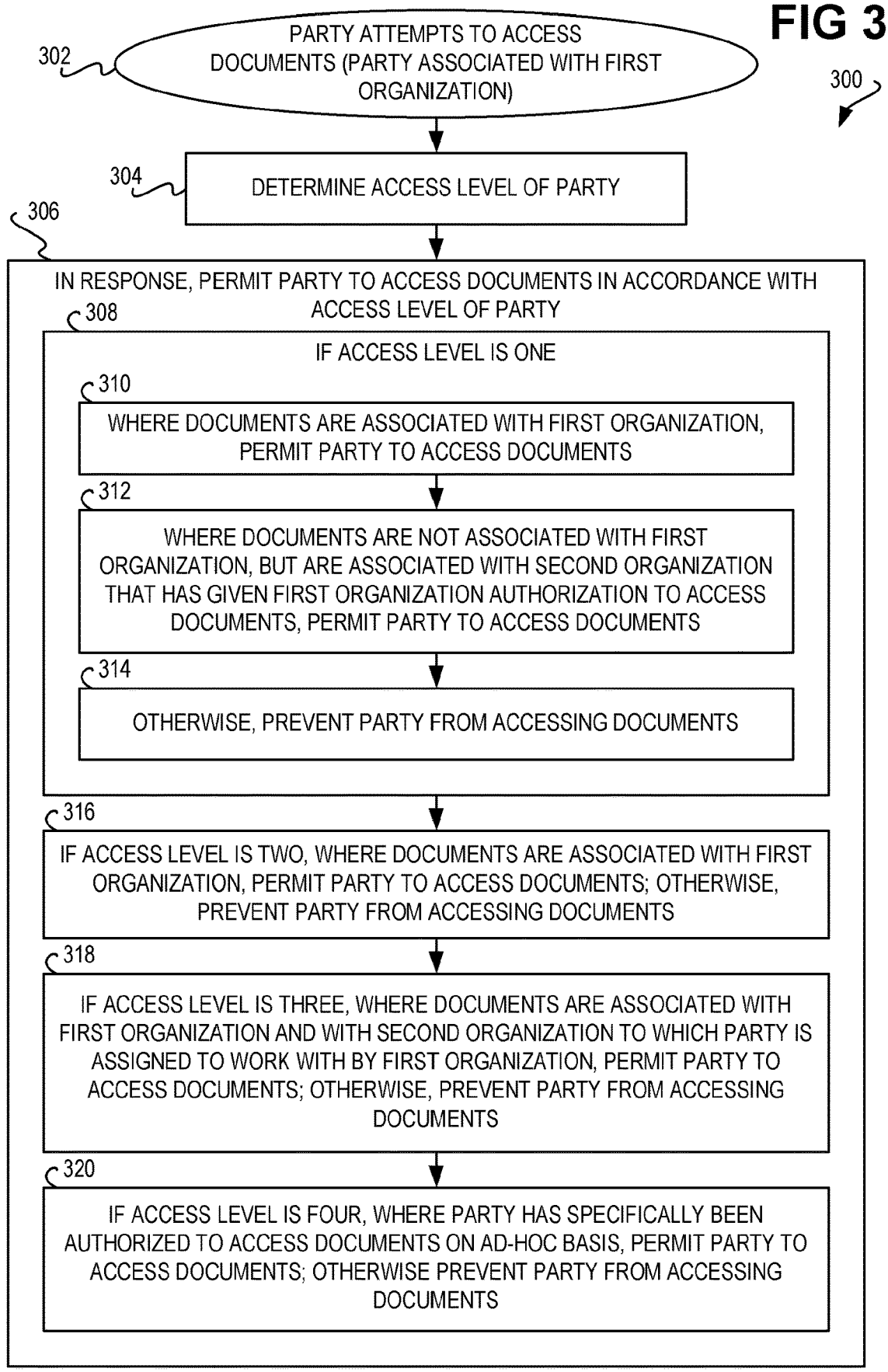

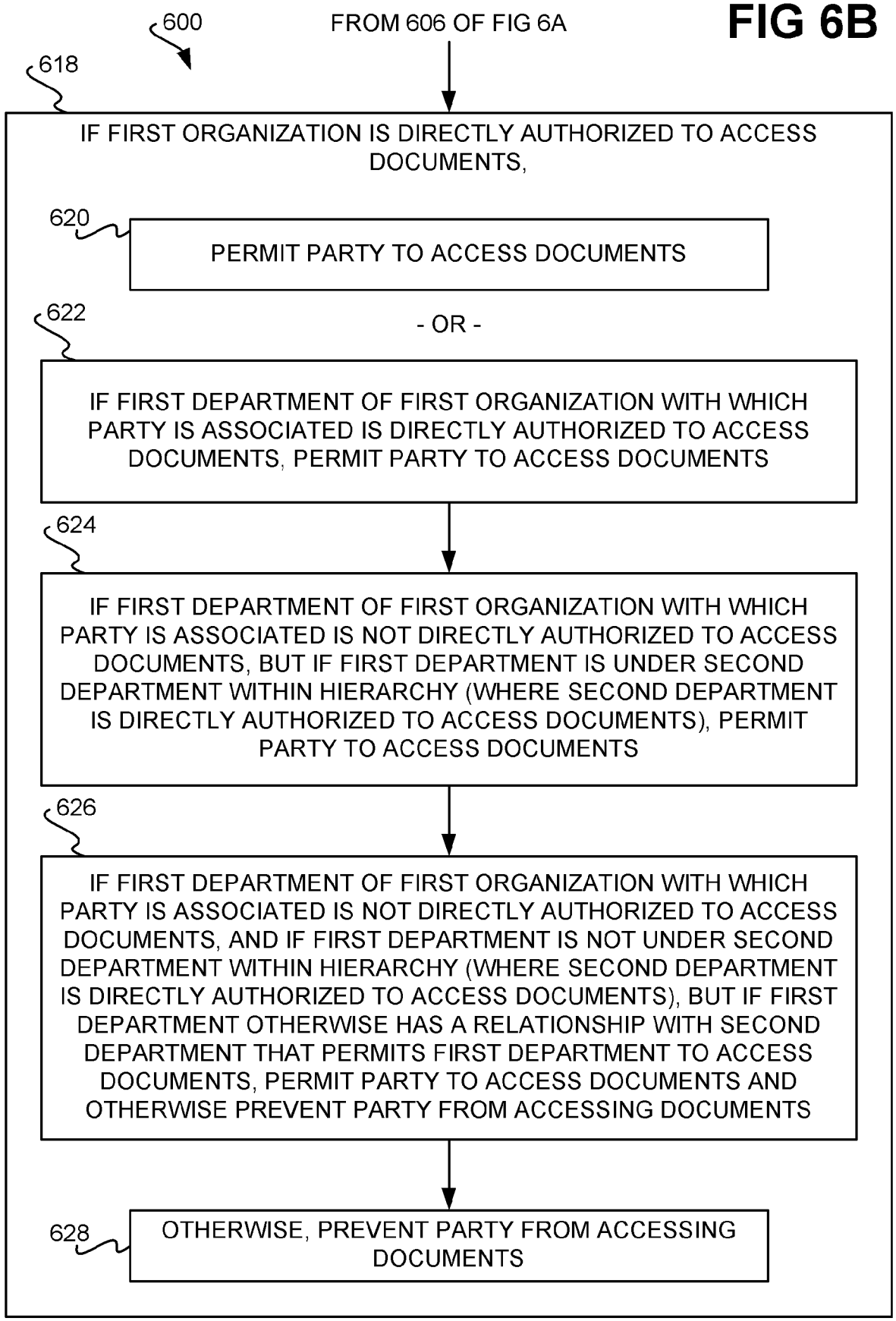

CONTROLLING ACCESS TO DOCUMENTS BY PARTIES

FIELD OF THE INVENTION

The present invention relates to controlling access to documents by parties. The documents may have one or more versions. The parties may be organized over a number of different organizations. Each organization may have a number of departments over which the parties of the organization are organized.

BACKGROUND

In many situations, multiple parties from multiple businesses and/or other organizations collaborate on documents that are maintained within a centralized document management system. For example, multiple parties from multiple organizations may collaborate on a contract and its associated documents, to revise the contract until all parties are satisfied with it. Access to such documents is typically controlled by the centralized document management system.

For instance, document access may be governed by a set of access control rules defined by authorized users or other parties. These rules dictate who, when, and how documents can be viewed and modified. For example, a contract-negotiation process may involve parties from three organizations: the customer, a service provider, and the supplier. The contract is not normally visible to parties of organizations other than these three organizations.

However, in the absence of a sufficient access control mechanism, typically every party—e.g., such as every user—of an organization is able to access all the documents associated with the organization, which can be a large number of documents. This is disadvantageous, because it can be difficult for a given party to find a document of interest. Furthermore, all parties of an organization may not need to or should not be able to view all the documents associated with the organization, such as documents that are irrelevant to a given party's job-related duties with the organization.

Within the prior art, role-based access control has been widely used, in which every user (i.e., party) is assigned a role and all users of a given role have the same access to documents. However, this means that parties with the same role but from different organizations have the same access to documents, potentially irrespective of whether the documents are associated with the organizations in question. While some prior art provides for different document access depending on the organization a given party is associated with, the problem of parties of the same organization having identical access to documents is still present.

These and other shortcomings within the prior art are addressed by embodiments of the present invention.

SUMMARY

The present invention relates to controlling access to documents by parties, such as users and other parties. The documents may have one or more versions. The parties may be organized over a number of different organizations. Furthermore, each organization may have a number of departments over which the parties of the organization are organized.

A method of an embodiment of the invention is responsive to a party attempting to access documents, where the party is associated with a first organization. A number of organizations, including the first organization, are organized within a hierarchy. It is determined whether the first organization is directly authorized to access the documents. If not, then it is determined whether the party is authorized to access any document of other organizations within the hierarchy. If the party is not authorized to access any documents of other organizations within the hierarchy, then the party is prevented from accessing the documents. By comparison, if the party is authorized to access any documents of other organizations within the hierarchy, it is determined whether the first organization is under a second organization within the hierarchy, where the second organization is directly authorized to access the documents. If so, then the party is permitted to access the documents.

An article of manufacture of an embodiment of the invention includes a tangible computer-readable medium, and means in the medium. The tangible computer-readable medium may be a recordable data storage medium, or another kind of tangible computer-readable medium. The means in the medium may correspond to processor-executable instructions that are executable by one or more processors of one or more computing devices. The means is for controlling access to one or more documents by a number of parties, in accordance with one or more of the following. First, access may be controlled in accordance with access counters associated with the parties, as has been described above, for instance. Second, access may be controlled in accordance with access levels associated with the parties, as has also been described above, for instance. Third, access may be controlled in accordance with placement of organizations within a hierarchy of the organizations, as has also been described above, for instance.

Still other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 1A and 1B are flowcharts of a method for controlling access to documents, according to an access counter embodiment of the invention.

FIGS. 2A and 2B are diagrams of examples of access control to documents, according to differing access counter embodiments of the invention.

FIG. 3 is a flowchart of a method for controlling accessing to documents, according to an access level embodiment of the invention.

FIGS. 6A and 6B are diagrams of examples of access control to documents, according to differing hierarchy embodiments of the invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Access Counter Embodiments

In this section of the detailed description, access counter embodiments of the invention for controlling access to documents are disclosed. First a general method is described, and thereafter some examples are presented to help understand the method. In general, each party that may have access to documents has an associated access counter. Prior to the creation of the first version of the documents, this access counter for each party is set to zero. Thereafter, as versions of the documents are created, the access counters are variously incremented, and the values of the access counters dictate access of the parties to the documents.

Figure 1B:
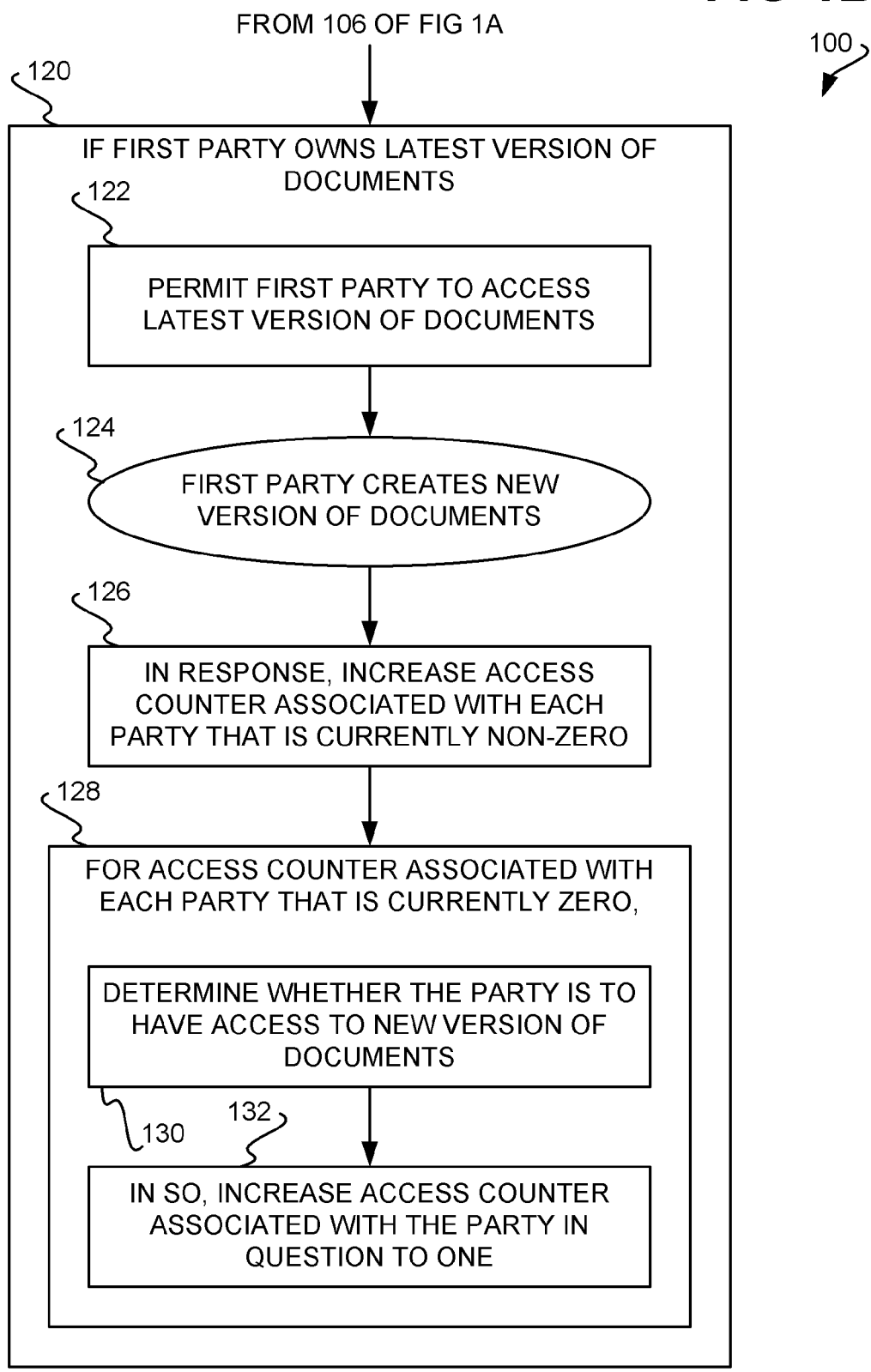

As such, FIGS. 1A and 1B show a method 100, according to an access counter embodiment of the invention. What is referred to as a first party attempts to access documents (102). The first party may be a user associated with a first organization, for instance. The documents may be a contract and the contract's supporting documents in one embodiment. Access to the documents can mean read, write, and/or update access to the documents. It is noted that parties within certain roles or access levels in the same organization may use the same access counter to control only the read access to documents. By comparison, only an authorized party or parties within appropriate roles or access levels in an owning organization may have both read and update (i.e., write) access to the documents. The documents are versioned in the embodiment of FIGS. 1A and 1B, meaning that as changes are made to the documents, different versions of the documents may exist.

In response to the first party attempting to access the documents, it is determined whether the first party owns the latest version of the documents (104). Ownership of a given version of the documents may mean that what can be referred to as an owning party has created this given version of the documents, or has most recently updated or otherwise modified this version of the documents. Thus, if the first party owns the latest version of the documents, then this can mean that the first party created, modified, or otherwise most recently updated the documents as they exist in their latest version. It is noted that for purposes of navigating through the method 100, where no versions of the documents yet exist, it can be said that all parties own the latest version of the documents. Furthermore, more than one party may own a given version of the documents.

If the first party does not own the latest version of the documents, then the following is performed (106). First, it is determined whether a first access counter associated with the first party is less than a second access counter associated with a second party that does own the latest version of the documents (108). If the first access counter is less than the second access counter, then the following is performed (110). More specifically, the first party is prevented from accessing the latest version of the documents (112). Moreover, if the first access counter is zero, then the first party is prevented from accessing any version of the documents (114).

By comparison, if the first access counter is non-zero, then the first party may be permitted to access one or more older versions of the document, in accordance with the value of the first access counter (116). For example, the first access counter may be one, but the first party may not own the latest version of the documents. The latest version of the documents may be owned by a second party, the second access counter of which may be two. There thus may be two versions of the documents, a first version and a more recent second version. The first party may have been authorized access to the first version of the documents. Therefore, the first party in part 116 is able to access the first version of the documents, but not the second version of the document.

If the first access counter is not less than the second access counter, however, then the first party is permitted to access the latest version of the documents (118). For example, the first access counter may be two, but the first party may not own the latest version of the documents. The latest version of the documents may be owned by a second party, the second access counter of which may be one. There may be three versions of the documents, older first and second versions, and a most recent third version. The second party may be the owner of the most recent third version. Therefore, the first party in part 118 is able to access the third version of the documents, due to the first access counter not being less than the second access counter.

By comparison, if the first party does own the latest version of the documents, then the following is performed (120). First, the first party is permitted to access the latest version of the documents (122). Second, for the purposes of the method 100, it is presumed at some point that the first party creates a new version of the documents (124), where this new version supplants the previous latest version of the documents to become the current latest version of the documents. In such case, in response, the access counter associated with each party that is currently non-zero is incremented (126).

Furthermore, for the access counter associated with each party that is currently zero, the following is performed (128). First, it is determined whether the party is to have access to the new version of the documents (130). If so, then the access counter associated with this party is incremented in to one (132). The method 100 is repeated as different parties attempt to access the documents.

Figure 2A:
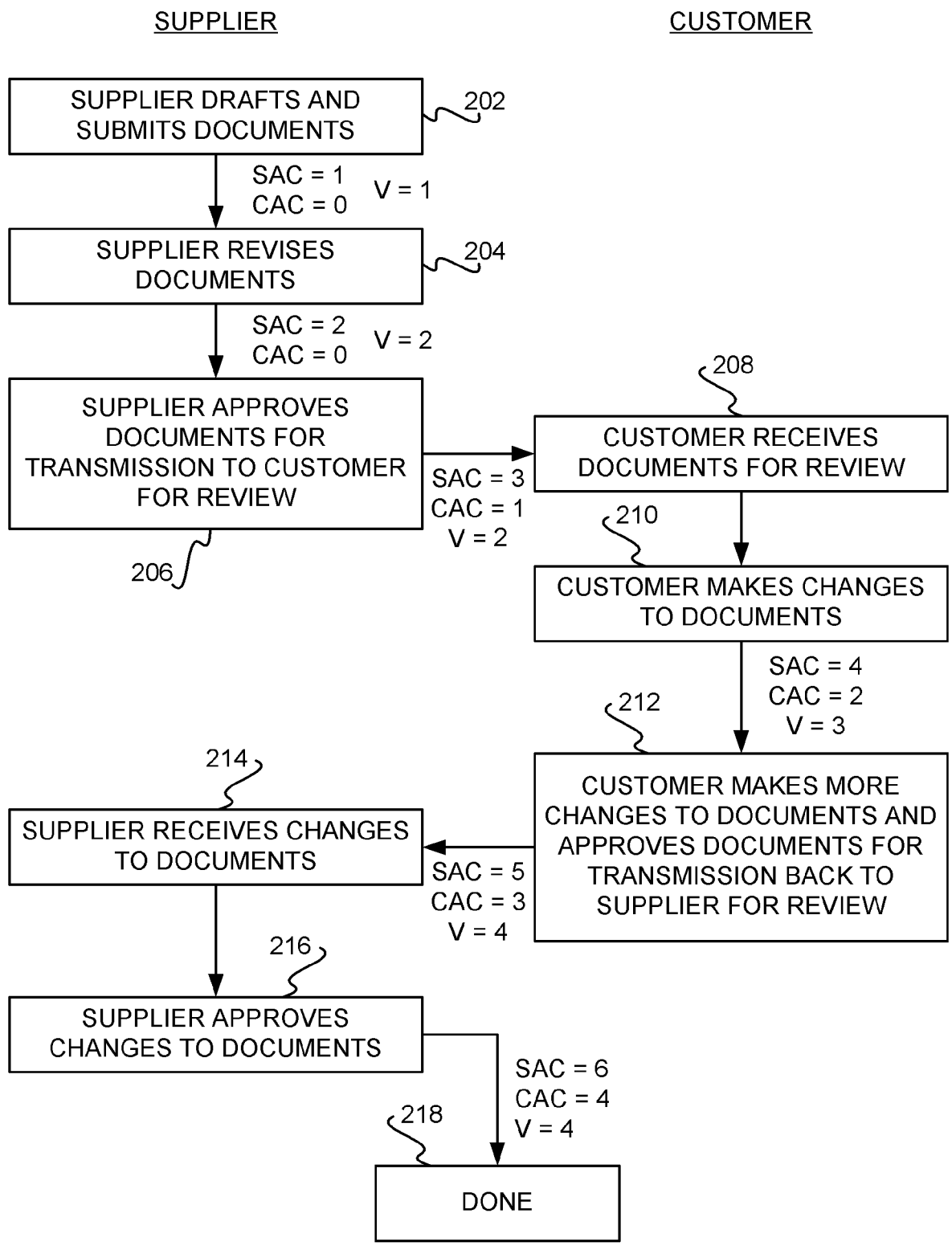

FIG. 2A shows example document access control in relation to two parties, a supplier and a customer, according to an access counter embodiment of the invention, and which represents performance of the method 100 that has been described. The documents in question may be a contract that the two parties are working on together. In FIG. 2A, SAC means the supplier's access counter, CAC means the customer's access counter, and V means the latest version of the document.

The supplier drafts and submits the document to a centralized document management system (202). At this time, the access counter of the supplier is one, the access counter of the customer is zero, and the latest version of the documents is one. In accordance with the method 100, the supplier can access this version of the documents, but the customer cannot. The supplier is the current owner of the documents.

The supplier may revise the documents (204), and remains the current owner of the documents. As such, the access counter of the supplier is incremented to two, and the latest version of the documents is two, but the customer still cannot access any version of the documents. Once the supplier approves the documents for transmission to the customer for review (206), such that the customer receives the documents for review (208), the access counter of the supplier is incremented again, to three, although the version of the documents stays the same at two. However, because the customer is now permitted to access this version of the documents, the access counter of the customer is incremented to one.

The customer may also make changes to the documents (210), and becomes the owner of the latest version of the documents. As such, in accordance with the method 100, the access counter of the supplier is incremented to four, the access counter of the customer is incremented to two, and the version of the documents is incremented to three. The customer may make more changes to the documents, and then approve the documents for transmission back to the supplier for review (212). As such, the access counter of the supplier is incremented to five, the access counter of the customer is incremented to three, and the version of the documents is incremented to four.

The supplier may ultimately approve the changes made by the customer to the documents (216), such that the example of FIG. 2A is completed (218). Upon approval of the changes to the documents, the supplier's access counter is incremented to six, and the customer's access counter is incremented to four. However, the version of the documents remains at four, because the content of the documents did not actually change as a result of the supplier's approval.

FIG. 2B shows example document access control in relation to three parties, a distributor, a reseller, and a customer, according to an access counter embodiment of the invention, and which represents performance of the method 100 that has been described. The documents in question may again be a contract that the four parties are working on together. In FIG. 2B, the first three columns denote the party, the access counters of these parties, and the most recent version of the documents to which the parties have access. The fourth column is in the form (performer)/state 4 action, where the performer (i.e., the distributor, reseller, or customer) performs the action denoted from the state denoted.

In the start state 252, the access counters of all four parties is initialized to zero, and no version of the documents has been generated, such that there are dashes ("-") in the third column of FIG. 2B. The distributor performs the action of submitting the documents to the centralized document management system from this state 252. This resulted in the submitted state 254, in which the access counter of the distributor has been incremented to one, and the latest version of the documents that the distributor can access is the first (and only) version of the documents.

From the state 254, the distributor may deny approval of the documents for dissemination to one of the other parties, to result in the denied state 256. In the denied state 256, the access counter of the distributor is incremented to two. From the state 256, the distributor may then update the documents, to result in the submitted state 258. In the submitted state 258, the access counter of the distributor is incremented to three, and the latest version of the document is two. From the state 258, the distributor may finally approve the documents for dissemination to the reseller, to result in the reviewed state 260. In the reviewed state 260, the access counter of the distributor has been incremented to four, while the access counter of the reseller has been incremented to one. The latest version of the document—two—can be accessed by both the distributor and the reseller.

From the state 260, the reseller processes the documents to the customer, to result in the new state 262, in which the access counter of the distributor has been incremented to five, the access counter of the reseller has been incremented to two, and the access counter of the customer has been incremented to one. The latest version of the documents—still two—is accessible by the distributor, the reseller, and the customer. The customer requests changes to be made, which are transmitted to the reseller to result in the change requested state 264, in which the access counters of the distributor, the reseller and the customer are each incremented by one, but the latest version of the document accessible by these parties remains the same.

From the state 264, the reseller updates the documents, to result in the updated state 266. The access counters of the distributor, the reseller, and the customer are again each incremented by one. However, just the distributor and the reseller can access the latest version of the documents—three—while the customer can just access the second version of the documents. From the state 266, the reseller approves the documents, to result in the new state 268, in which the access counters of the distributor, reseller, and the customer are again each incremented by one. At this time, the customer is authorized to access the latest version of the documents.

Access Level Embodiments

In this section of the detailed description, access level embodiments of the invention for controlling access to documents are disclosed. First a general method is described, and thereafter an example is presented to help understand the method. In general, each party that may have access to documents is associated with an organization. The documents to which access is desired are also associated with an organization. For example, the documents may form a contract that is between two organizations, such that it is said that the documents are assigned to (i.e., associated with) both of these organizations. A given user may be associated with either of these two organizations, or a completely different organization in one embodiment.

As such, FIG. 3 shows a method 300, according to an access level embodiment of the invention. A party attempts to access documents (302). The party may be a user, and is associated with a first organization. The documents may be a contract and the contract's supporting documents in one embodiment. Access to the documents can mean read, write, and/or update access to the documents.

The access level of the party is determined (304). The access level in one embodiment can be one, two, three, or four—that is, a first access level, a second access level, a third access level, or a fourth access level. The access levels are ordered from the first access level to the fourth access level, in which the first access level provides the greatest degree of access to documents and the fourth access level provides the least degree of access to the documents. The party is permitted to (or denied) access to the documents in accordance with his or her access level (306).

For instance, if the party's access level is one, access to the documents is governed as follows (308). Where the documents are associated with the first organization with which the party is also associated, then the party is permitted to access the documents (310). However, if the documents are not associated with the first organization, but are associated with a second organization that has given the first organization authorization to access the documents, then the permit is still permitted to access the documents (312). Otherwise—i.e., if parts 310 and 312 do not hold—then the party is prevented from accessing the documents (314).

If the party's access level is two, if the documents are associated with the first organization, then the party is permitted to access the documents, and is otherwise prevented from accessing the documents (316). For example, the second organization with which the documents are associated may have given the first organization authorization to access the documents, but if the party's access level is two, the party is still prevented from accessing the documents. Just parties within the first organization that have access levels of one are permitted to access the documents in this scenario.

If the party's access level is three, if the documents are associated with the first organization and with a second organization to which the party has been assigned to work with by the first organization, then the party is permitted to access the documents; otherwise, the party is prevented from accessing the documents (318). For example, the documents may be a contract between the first and the second organizations, such that the documents are associated with both the first and the second organizations. If the party's access level were one or two, then the party would be permitted to access the documents. However, where the party's access level is three, then the party is permitted to access the documents only if the party's (first) organization has assigned him or her to work with the second organization with which the documents are also assigned.

Finally, if the party's access level is four, if the party has been specifically been authorized to access documents on an ad-hoc basis, then the party is permitted to access the documents and otherwise is prevented from accessing the documents (320). For example, the documents may be associated both with the first organization and a second organization. If the party's access level were one or two, then the party would be permitted access to the documents; and, if the party's access level were three, then the party would be permitted access if the first organization had assigned the party to work with the second organization. However, where the party's access level is four, then the party is only able to access the documents if he or she has been specifically authorized to do so by the first organization, on an ad-hoc basis.

Figure 4:
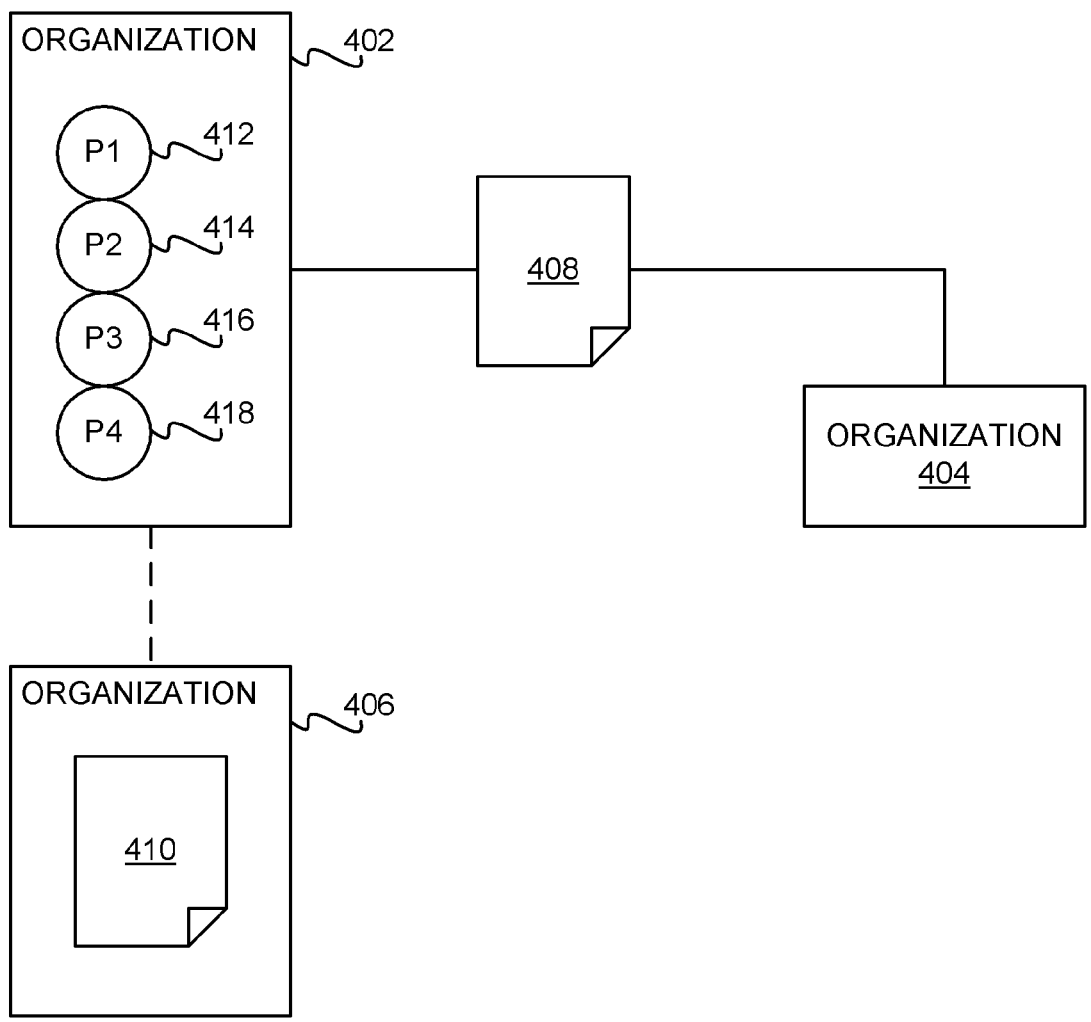
FIG. 4 is a diagram of an example of access control to documents, according to an access level embodiment of the invention.

FIG. 4 shows example document access control in relation to four parties and three organizations, according to an access level embodiment of the invention. There are three organizations 402, 404, and 406. The organizations 402 and 404 are working together on the documents 408, as indicated by the solid lines connecting the organizations 402 and 404 to the documents 408 such that the documents 408 are said to be associated with both the organizations 402 and 404. The organization 406 is working on its own documents 410. However, the organization 406 has authorized the organization 402 access to the documents 410, as indicated by the dotted line connecting the organizations 402 and 406.

The organization 402 includes four parties, or users, 412, 414, 416, and 418. The party 412 has an access level of one as has been described in the method 300. The party 414 has an access level of two as has been described in the method 300. The party 416 has an access level of three as has been described in the method 300. The party 418 has an access level of four as has been described in the method 300.

The party 412 is able to access the documents 408, per part 310 of the method 300. The party 412 is also able to access the documents 410, per part 312 of the method 300. The party 414 is able to access the documents 408, per part 316 of the method 300, but is never permitted to access the documents 410. The party 416 is able to access the documents 408 if the party 416 has been assigned by the organization 402 to work with the organization 404 on the documents 408 and otherwise is not permitted to access the documents 408, per part 318 of the method 300. The party 416 is never permitted to access the documents 410. The party 418 is able to access the documents 408 if the party 418 has been authorized to do so on an ad-hoc basis and otherwise is not permitted to access the documents 408, per part 320 of the method 300. The party 418 is never permitted to access the documents 410.

Hierarchy Embodiments

In this section of the detailed description, hierarchy embodiments of the invention for controlling access to documents are disclosed. First hierarchical control examples are described, and thereafter a general method is presented that encompasses the examples. In general, each party that may have access to documents is associated with an organization. This organization is organized within a hierarchy of a number of organizations. Each party may also be associated with a department within its organization, where the hierarchy includes a number of such departments that are also organized in a (different) hierarchy. The documents to which access is desired are associated with an organization as well.

Figure 5A:
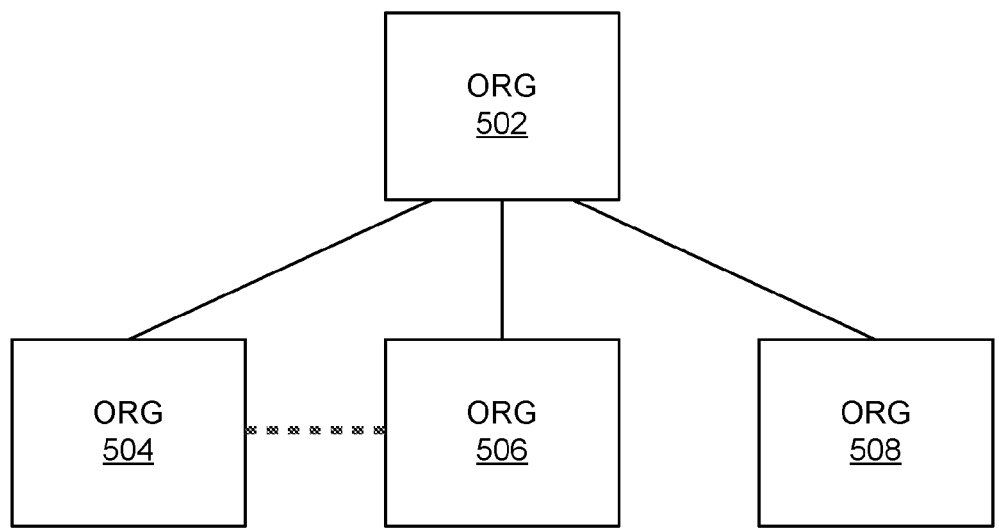
FIGS. 5A and 5B are flowcharts of a method for controlling access to documents, according to a hierarchy embodiment of the invention.

FIG. 5A shows a representative hierarchy of organizations that governs access control to documents, according to a hierarchy embodiment of the invention. There are four organizations 502, 504, 506, and 508. The organization 502 is above the organizations 504, 506, and 508 in the hierarchy, and the organizations 504, 506, and 508 are at equal levels within the hierarchy. This means that if the organization 502 is associated with one or more documents, the organizations 504, 506, and 508 necessarily also have access to the documents in question. By comparison, if, for example, the organization 504 is associated with a document, none of the other organizations 502, 506, and 508 necessarily have access to the documents in question. However, the organization 504 has a special relationship with the organization 506, as indicated by the dotted line between the organizations 504 and 506, such that the organization 504 can access the documents associated with the organization 506, and/or vice-versa.

Figure 5B:
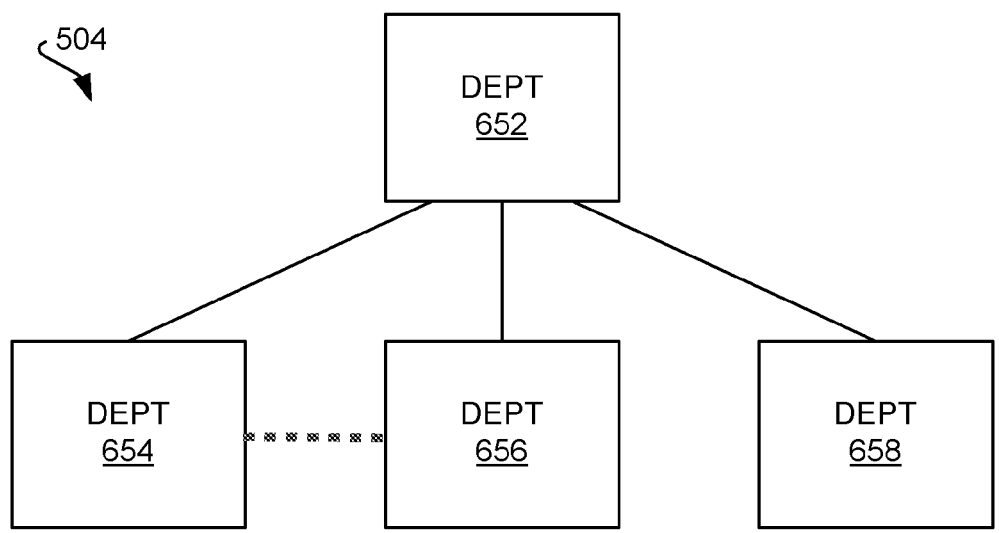

FIG. 5B shows a representative hierarchy of departments within the organization 504 in particular, and which also governs access control to documents, according to a hierarchy embodiment of the invention. There are four departments 652, 654, 656, and 658. The department 652 is above the departments 654, 656, and 658 in the hierarchy, and the departments 654, 656, and 658 are at equal levels within the hierarchy. This means that if the department 652 is associated with one or more documents, the departments 654, 656, and 658 necessarily also have access to the documents. By comparison, if, for example, the department 654 is associated with a document, none of the other departments 652, 656, and 658 necessarily have access to the documents in question. However, the department 654 has a special relationship with the department 656, as indicated by the dotted line between the departments 654 and 656, such that the department 654 can access the documents associated with the department 656, and/or vice-versa.

Figure 6A:
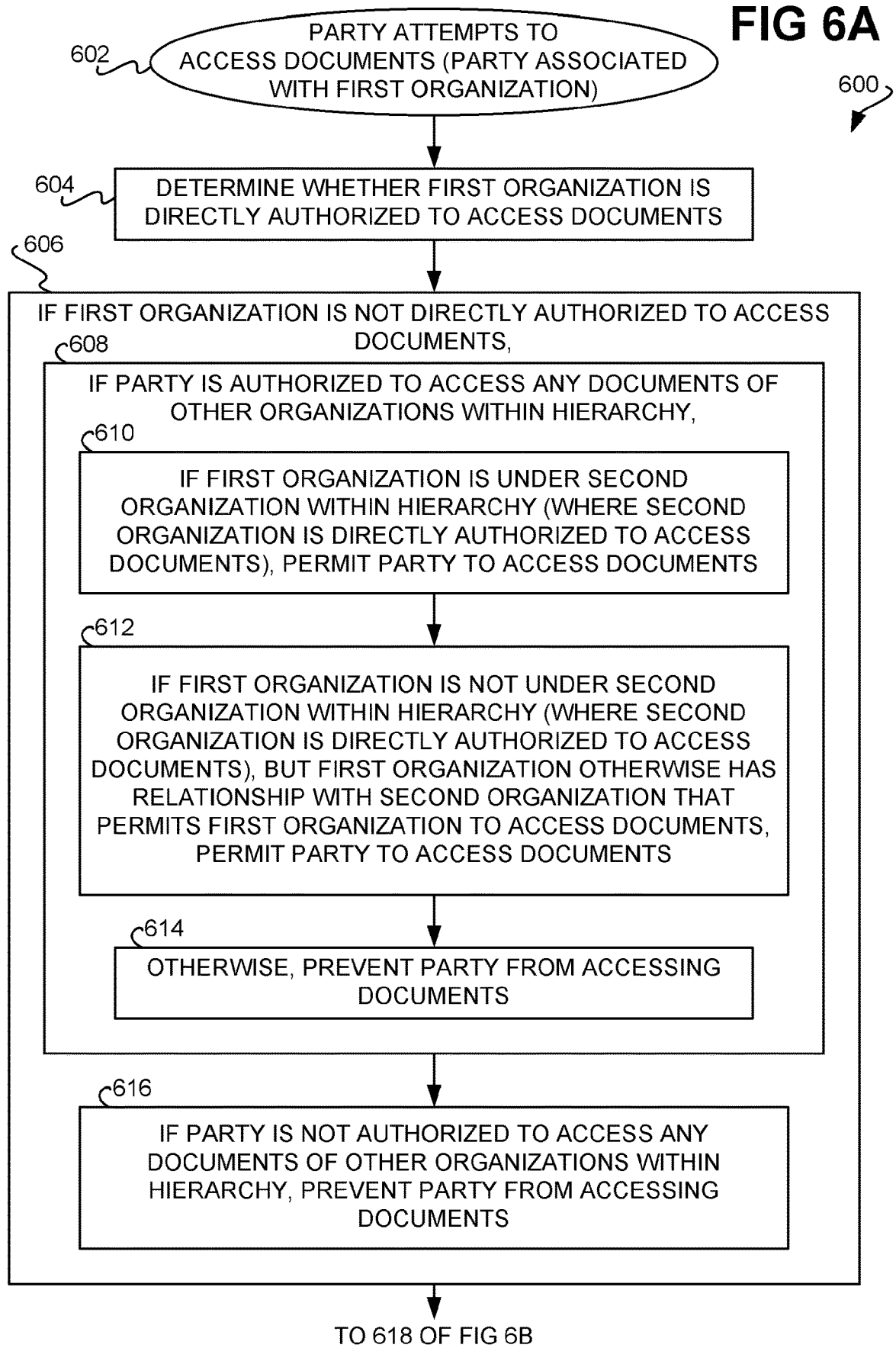

FIGS. 6A and 6B show a method 600, according to a hierarchy embodiment of the invention. A party that is associated with a first organization attempts to access documents (602). The party may be a user within the first organization. The documents may be a contract and the contract's supporting documents in one embodiment. Access to the documents can mean read, write, and/or update access to the documents.

It is determined whether the first organization is directly authorized to access the documents (604). Direct authorization in this respect may mean that the first organization is associated with the documents. For example, the first organization may be a party to a contract of which the documents are a part. Direct authorization can mean other things as well. For example, the first organization may have been directly authorized to access the documents by another organization, even though the first organization is not, for instance, a party to a contract of which the documents are a part.

If the first organization is not directly authorized to access the documents, then the following is performed (606). First, if it is determined that the party is authorized to access any documents of other organizations within the hierarchy (e.g., the party may have a first access level accorded thereto, as described in the previous section of the detailed description), then the following is performed (608). If it is determined that the first organization is under a second organization within the hierarchy, where the second organization does have direct authorization to access the documents, then the party is permitted to access the documents (610).

For example, the first organization may be the organization 504, and the second organization may be the organization 502. The organization 502 thus has direct authorization to access the documents, but the organization 504 does not. If the party is authorized to access documents of other organizations, then the party is permitted access to the documents, due to the organization 504 being under the organization 502 within the hierarchy of FIG. 5A.

By comparison, if it is determined that the first organization is not under a second organization within the hierarchy that does have direct authorization to access the documents, but it is determined that the first organization otherwise has a relationship with the second organization that permits the former to access the documents associated with the latter, then the party is permitted access to the documents (612). For example, the first organization may be the organization 504, and the second organization may be the organization 506. The organization 504 does not have direct authorization to access the documents, but the organization 506 does. Even though the organization 504 is not under the organization 506 within the hierarchy of FIG. 5A, if the party is authorized to access documents of other organizations, then the party is still permitted to access the documents, due to the special relationship between the organizations 504 and 506 as indicated by the dotted line between these organizations 504 and 506 in FIG. 5A.

However, if neither the conditions of part 610 nor the conditions of part 612 are true, the party is prevented from accessing the documents (614). This is the case even though the party is authorized to access documents of other organizations within the hierarchy. Likewise, if the party is not authorized to access any documents of other organizations within the hierarchy, the party is prevented from accessing the documents in question (616).

As compared to the case described in relation to part 606, the other case is where the first organization is directly authorized to access the documents (618). In one embodiment, the party may simply be permitted to access the documents (620). However, in another embodiment, parts 622, 624, and/or 626 are performed in lieu of automatically permitting the party to access the documents in part 620. In parts 622, 624, and/or 626, the hierarchy of the departments of the first organization is considered. In particular, it is presumed that the part is associated with or otherwise belongs to a first department within this first organization.

Therefore, if it is determined that the first department of the first organization with which the party is associated is directly authorized to access the documents, then the party is permitted to access the documents (622). However, if the first department is not directly authorized to access the documents, but if it is determined that the first department is under a second department that is directly authorized to access the documents, then the party is still permitted to access the documents (624). For example, the first department may be the department 654, while the second department may be the department 652. Because the department 654 is under the department 652 within the hierarchy of FIG. 5B, the party is permitted to access the documents even if the department 654 is not authorized to access the documents if the department 652 is authorized to access the documents.

By comparison, if the first department is not directly authorized to access the documents, and if the first department is not under a second department that is directly authorized to access the documents, but if the first and the second departments have a relationship permitting the former to access the documents associated with the latter, then the party is still permitted to access the documents (626). For example, the first department may be the department 654, while the second department may be the department 656. Even though the department 654 is not under the department 656 within the hierarchy of FIG. 5B, the party is permitted to access the documents because the department 654 has a relationship with the department 656, indicated by the dotted line in FIG. 5B, permitting the former to access the documents associated with the latter. However, if none of the conditions of parts 622, 624, and 626 is true, then the party is still prevented from accessing the documents in question (628).

Representative Document Management Environment and Conclusion

Figure 7:
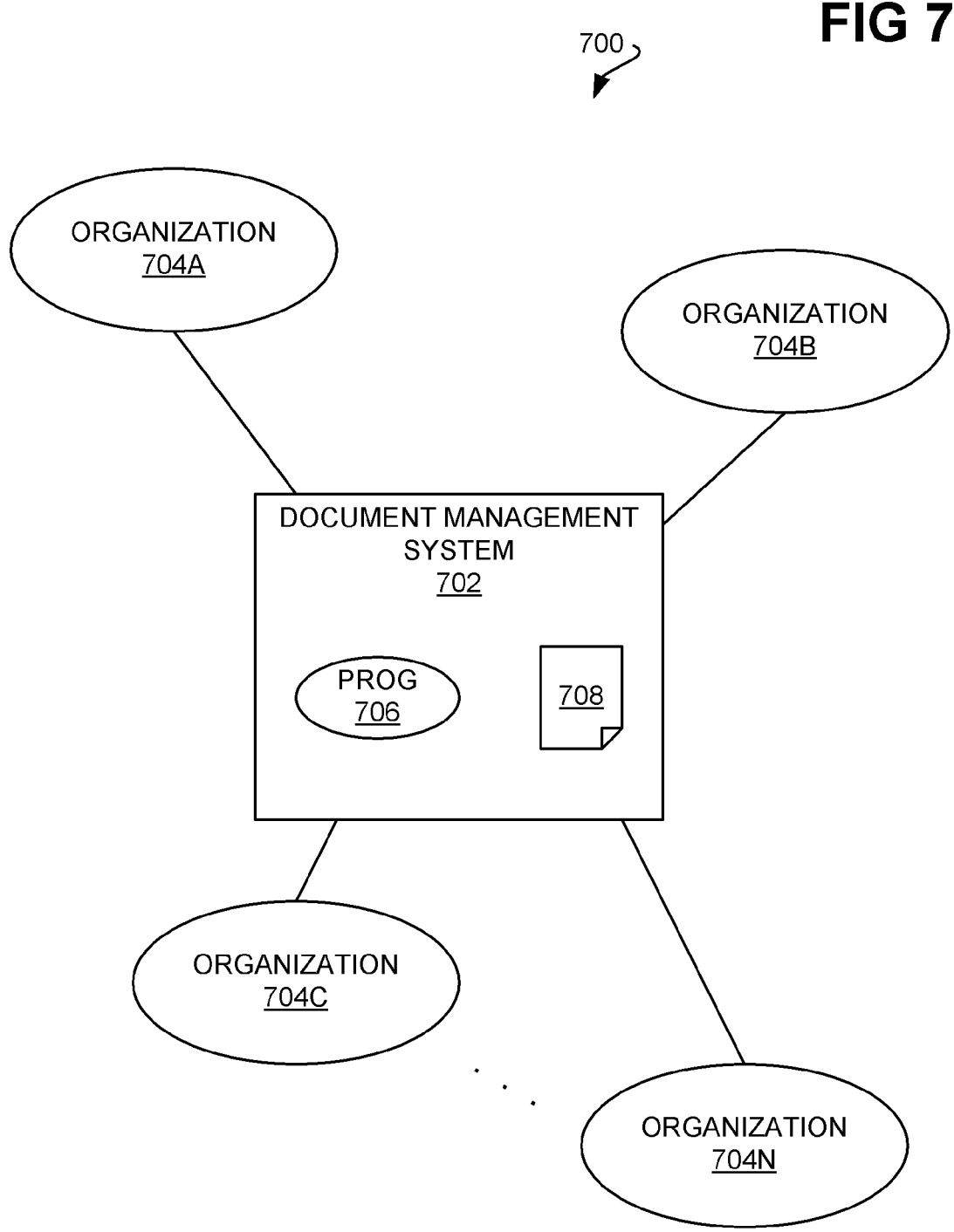
FIG. 7 is a diagram of a representative document management environment, according to an embodiment of the invention.

FIG. 7 shows a rudimentary and representative document management environment 700, according to an embodiment of the invention. The environment 700 includes a centralized document management system 702, to which organizations 704A, 704B, 704C, . . . , 704N, collectively referred to as the organizations 704 are communicatively coupled. For example, the system 702 may be implemented as one or more computing devices, having processors, memory, storage devices, and so on. The organizations 704 may communicatively connect with the system 702 by virtue of their computing devices being connected to the same network(s) to which the system 702 is connected. Such networks can include the Internet, intranets, extranets, local-area networks (LAN's), wide-area networks (WAN's), wired networks, wireless networks, and/or other types of networks.

The document management system 702 includes a computer-readable medium 706, such as a volatile and/or a non-volatile medium, which stores one or more computer programs that when executed by one or more processors of the system 702 are able to govern access to documents 708. Such access to the documents 708 is governed in accordance with one or more access control approaches, such as those that have been described in the previous sections of the detailed description: an access counter approach, an access level approach, and/or a hierarchy approach. The documents 708 themselves are thus associated in different subsets thereof among the different organizations 704. When a party of a given organization requests access to a given document or documents, therefore, the system 702 accords access by performing one or more of the methods that have been described in the previous sections of the detailed description. The documents 708 are themselves electronic files stored on a storage device of the system 702, as can be appreciated by those of ordinary skill within the art.

Finally, it is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A computer-implemented method for controlling access to one or more electronic documents by a plurality of parties who are collaborating on the electronic documents via a network, the parties organized over a plurality of organizations, the organizations organized within a hierarchy, the computer-implemented method comprising:
    storing, by one or more processors, versions of the electronic documents as the versions of the electronic documents are created in a centralized document management system comprising the one or more processors;
    incrementing, by the one or more processors, access counters associated with the versions of the electronic documents as the versions of the electronic documents are created, wherein values of associated access counters determine access to the versions of the electronic documents;
    in response to the one or more processors determining that a party of the plurality of parties collaborating on the electronic documents is attempting to access a current version of the electronic documents, which is maintained in the centralized document management system, via the network, the party associated with a first organization,
        determining, by the one or more processors, whether the first organization is directly authorized to access the electronic documents based on a current value of an access counter associated with the current version of the electronic documents;
        in response to the one or more processors determining that the first organization is not directly authorized to access the current version of the electronic documents,
            determining, by the one or more processors, whether the party is authorized to access any electronic documents of other organizations within the hierarchy;
            in response to the one or more processors determining that the party is not authorized to access any electronic documents of other organizations within the hierarchy, preventing, by the one or more processors, the party from accessing the current version of the electronic documents; and
            in response to the one or more processors determining that the party is authorized to access any electronic documents of other organizations within the hierarchy,
                determining, by the one or more processors, whether the first organization is under a second organization within the hierarchy, the second organization directly authorized to access the electronic documents.

2. The computer-implemented method of claim 1, further comprising:
    in response to the one or more processors determining that the first organization is not under the second organization within the hierarchy, the second organization directly authorized to access the current version of the electronic documents based on the current value of the access counter associated with the current version of the electronic documents, determining, by the one or more processors, whether the first organization otherwise has a relationship with the second organization that permits the first organization to access the current version of the electronic documents;
    in response to the one or more processors determining that the first organization otherwise has a relationship with the second organization that permits the first organization to access the current version of the electronic documents, permitting, by the one or more processors, the party to access the current version of the electronic documents; and,
    in response to the one or more processors determining that the first organization does not otherwise have a relationship with the second organization that permits the first organization to access the current version of the electronic documents, preventing, by the one or more processors, the party from accessing the current version of the electronic documents.

3. The computer-implemented method of claim 1 further comprising:
    in response to the one or more processors determining that the first organization is under the second organization within the hierarchy, the second organization directly authorized to access the current version of the electronic documents based on the current value of the access counter associated with the current version of the electronic documents, wherein at least the first organization has a plurality of departments organized within a second hierarchy, and the party is associated with a first department within the second hierarchy of the first organization,
        determining, by the one or more processors, whether the first department is directly authorized to access the current version of the electronic documents; and
        in response to the one or more processors determining that the first department is directly authorized to access the current version of the electronic documents, permitting, by the one or more processors, the party to access the current version of the electronic documents.

4. The computer-implemented method of claim 3, further comprising:
    in response to the one or more processors determining that the first department is not directly authorized to access the current version of the electronic documents, determining, by the one or more processors, whether the first department is under a second department within the hierarchy, the second department directly authorized to access the current version of the electronic documents; and
    in response to the one or more processor determining that the first department is under the second department within the hierarchy, the second department directly authorized to access the current version of the electronic documents, permitting, by the one or more processors, the party to access the current version of the electronic documents.

5. The computer-implemented method of claim 4, further comprising:
    in response to the one or more processors determining that the first department is not under the second department within the hierarchy, the second department directly authorized to access the current version of the electronic documents, determining, by the one or more processors, whether the first department otherwise has a relationship with the second department that permits the first department to access the current version of the electronic documents;

in response to the one or more processors determining that the first department otherwise has the relationship with the second department that permits the first department to access the current version of the electronic documents, permitting, by the one or more processors, the party to access the current version of the electronic documents; and, in response to the one or more processors determining that the first department does not otherwise have the relationship with the second department that permits the first department to access the current version of the electronic documents, preventing, by the one or more processors, the party from accessing the current version of the electronic documents.

* * * * *